Figure 1:
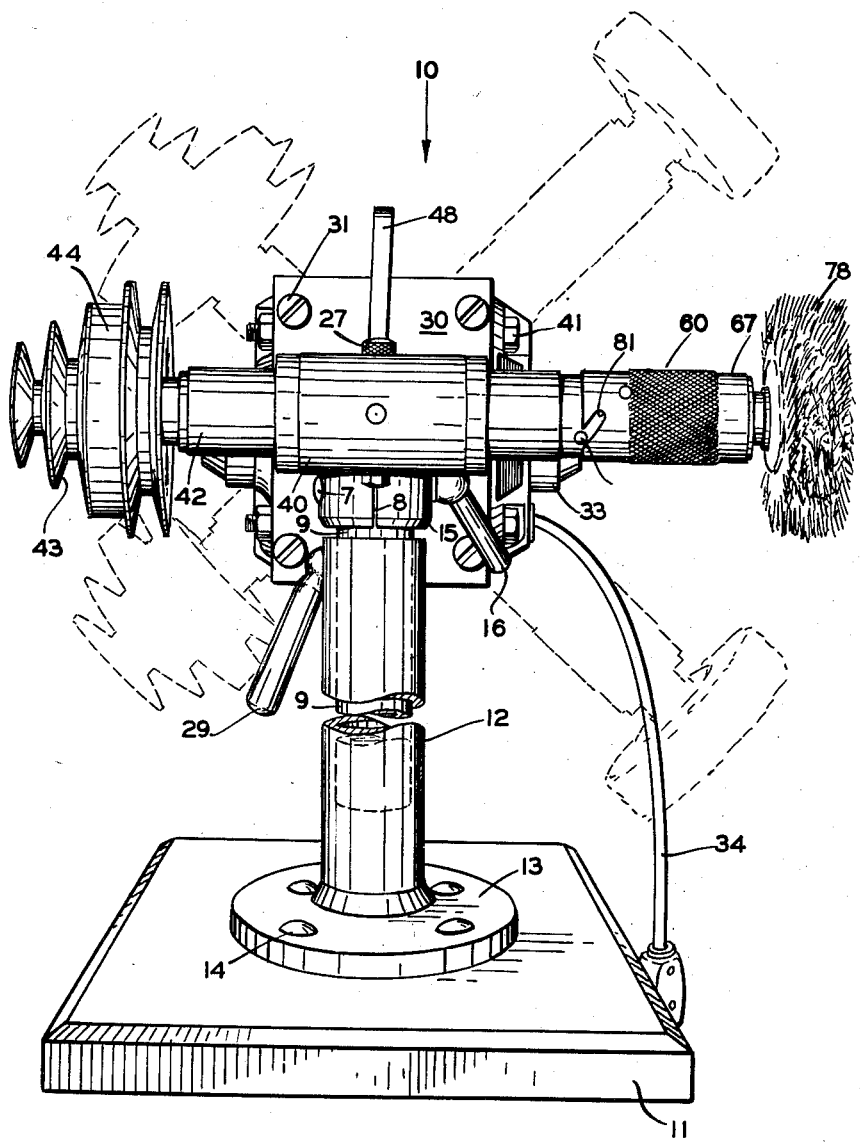

June 27, 1950  A. J. SCHICK  2,513,213
MACHINE TOOL
Filed Jan. 23, 1947  4 Sheets-Sheet 1

INVENTOR
ANTON J. SCHICK
BY
ATTORNEY

June 27, 1950      A. J. SCHICK      2,513,213
MACHINE TOOL

Filed Jan. 23, 1947      4 Sheets-Sheet 2

INVENTOR
ANTON J. SCHICK
BY
ATTORNEY

June 27, 1950 A. J. SCHICK 2,513,213
MACHINE TOOL
Filed Jan. 23, 1947 4 Sheets-Sheet 3

INVENTOR
ANTON J. SCHICK
BY
ATTORNEY

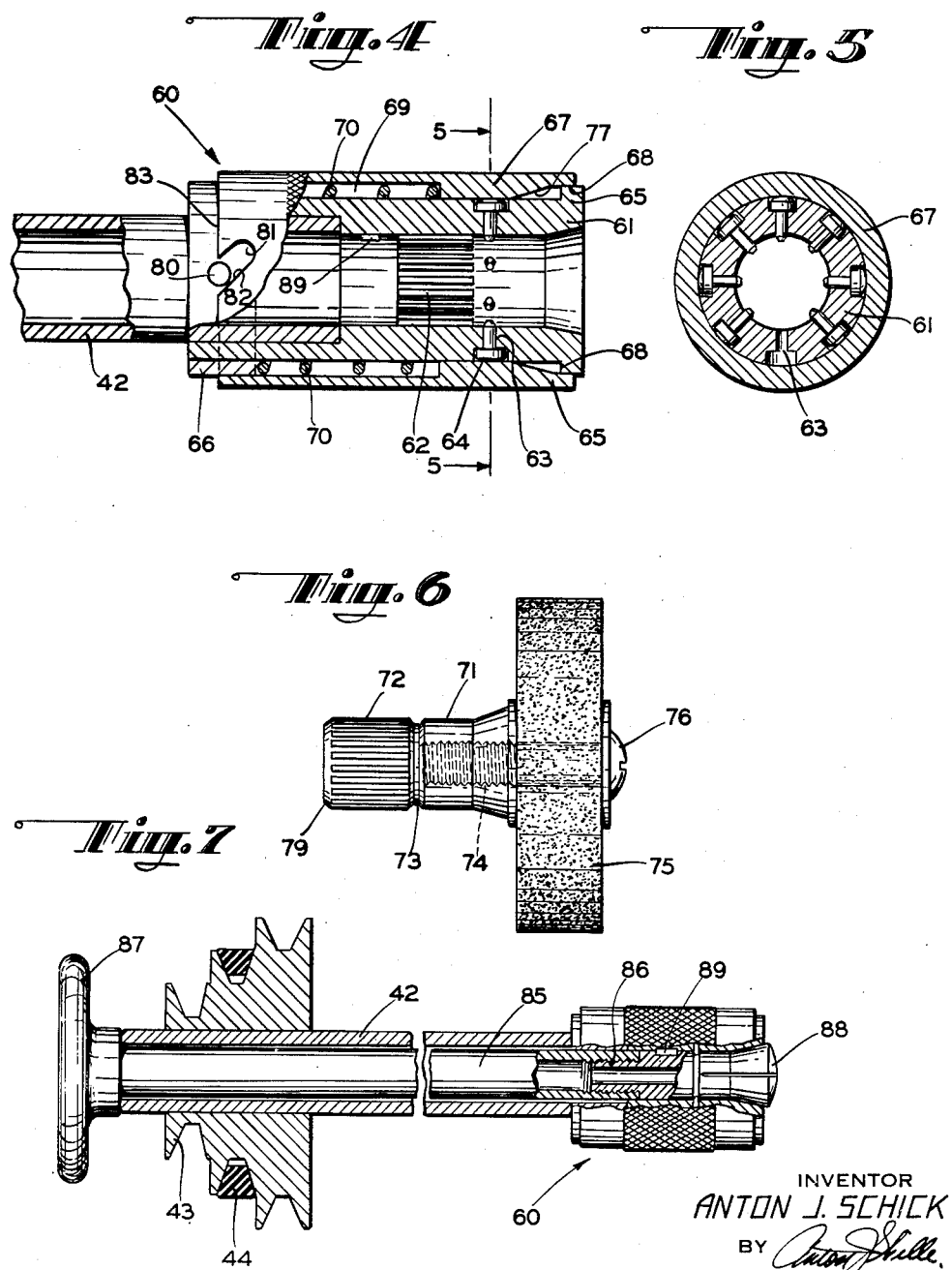

Patented June 27, 1950

2,513,213

UNITED STATES PATENT OFFICE 2,513,213

MACHINE TOOL

Anton J. Schick, Englewood, N. J., assignor to The Harick Company, Tenafly, N. J., a co-partnership Application January 23, 1947, Serial No. 723,765

9 Claims. (Cl. 51—166)

This invention relates in general to an all purpose machine, and more particularly to a machine having a universal movement whereby machining work may be done in practically any position.

In shop practice today, a large variety of machine tools are used in the fabrication of various products. Of general use, and one which has become extremely useful and popular in the manufacture of small parts, is the flexible shafting rotary tool machine. These units are extremely practical and lend themselves readily to diversified machining operations. However, it has been found that such tools have certain drawbacks which make them unhandy to use and costly to factory management.

When pressure is required, as in buffing or in polishing, or where facilities are lacking for holding the work steady, the practice has grown to clamp the shafting sheath or chuck collar in a vise to hold the rotating tool steady, the work being held in the hands of the workman. The sheath or collar is thus crimped ruining the bearings thereof.

Another drawback of the various machines in use today which I have overcome is the time consumed in changing tools. With key operated and threaded chucks the quick change of tools is impossible due to time required of turning the keys or sleeves, and the proper insertion and centering of the tools in the chuck before the tool is fastened in the chuck.

With these and other drawbacks in mind, and the lack of transportable features in such machines as grinders, drill presses, etc., I have provided an all purpose machine which may be used for diversified machining operations in which the work may be held in practically any position, which may be readily transportable from place to place, or fixed in one place; which is relatively inexpensive to manufacture, easy to operate, and positive in its operation; a machine which has a large variety of applications and which is nevertheless practical and efficient to a high degree in use. I have further provided a chuck for my universal machine whereby tools may be interchanged with rapidity and safety; and wherein the tool bearing arbor is locked in place by inertia and a camming action, preventing the release of the arbor until the tool chuck stops rotating.

These and other objects of the invention will in part be obvious and in part pointed out in the description hereinafter made.

This invention accordingly consists in the features of construction, combinations of elements, and arrangement of parts which will be exemplified in the construction hereinafter described, and of which the scope of application will be indicated in the appended claims.

Figure 2:
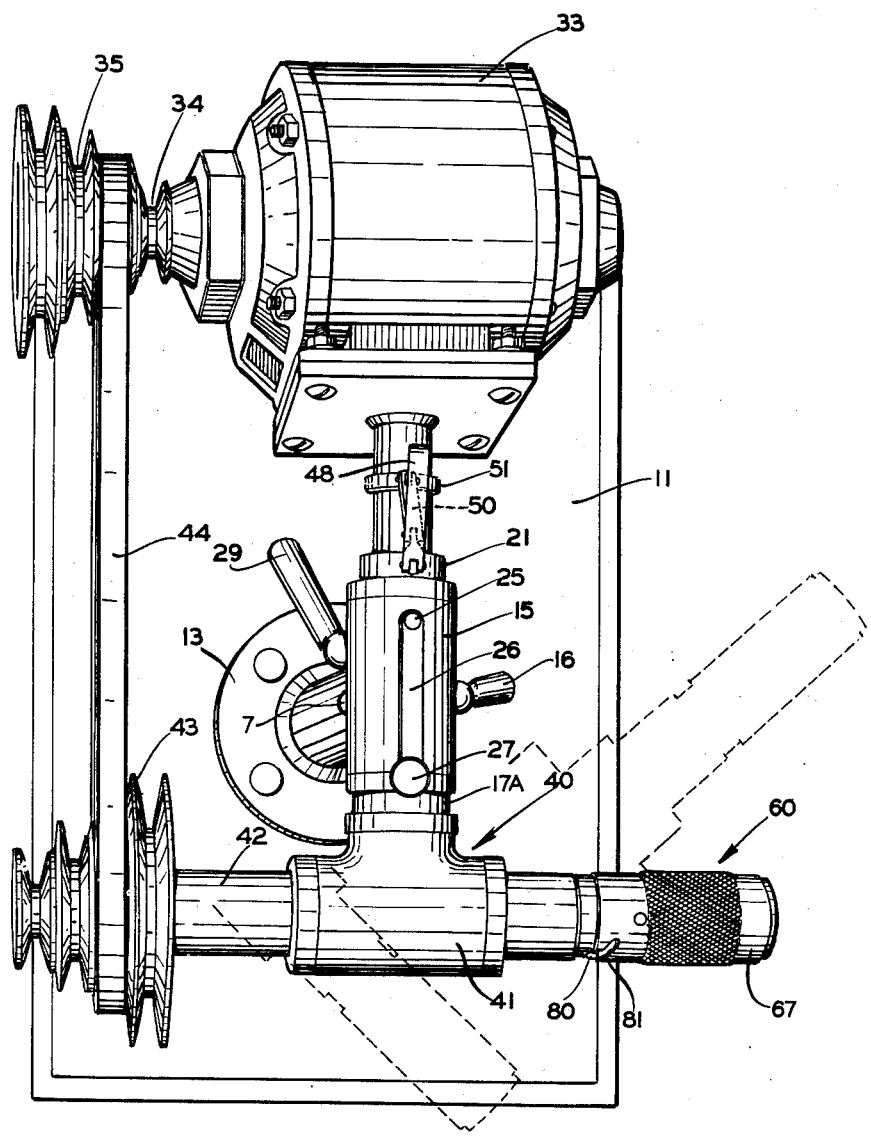
Figure 3:
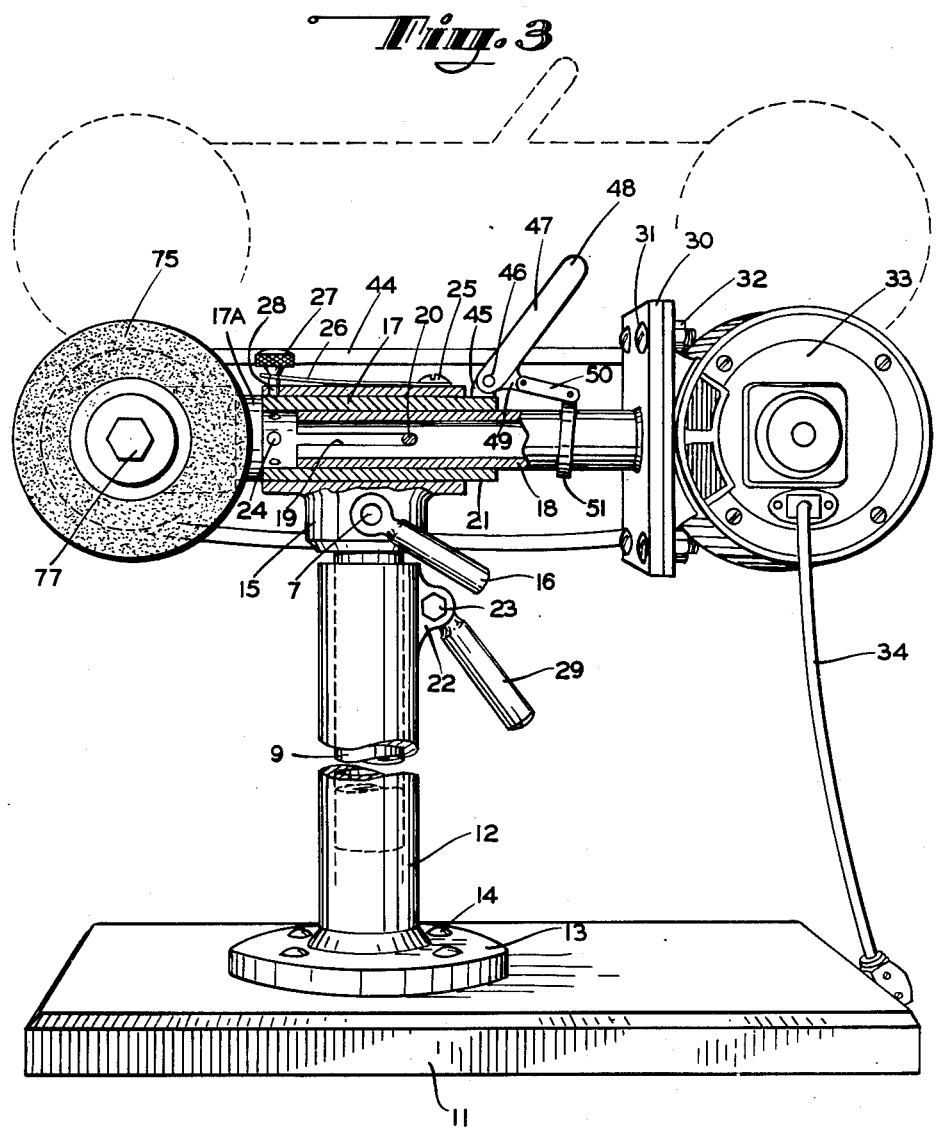

In the accompanying drawings forming a part of this specification in which several possible illustrative embodiments of this invention are shown, and wherein similar reference characters designate corresponding parts throughout the several views, Fig. 1 is a front elevational view of a machine embodying my invention, Fig. 2 is a plan view of the machine, Fig. 3 is a side elevational view of the machine with portions shown in cross-section, Fig. 4 is a vertical section of my improved chuck, Fig. 5 is a sectional view taken along the line 5—5 of Fig. 4, Fig. 6 is an elevational view of a splined arbor for my chuck, while Fig. 7 is a sectional view of the chuck and the driving spindle showing a standard collet held therein.

Referring now in detail to the drawings, 10 designates a machine embodying my invention. The machine 10 is preferably mounted on a support 11 which may be a dolly (not shown) provided with wheels and a braking mechanism for holding the support steady. As will hereinafter be apparent the support 11 could very well be a bench top to which my machine may be permanently affixed. The machine is supported on an upright standard 12 provided with a flanged member 13 fixed, as by rivets 14, to the platform support 11.

For the purposes hereinafter apparent, a shafting 9 is slidably received within standard 12 having a T-connection 15 secured to the upper end thereof in a suitable manner. The T-connection 15 is of the split type and is formed with a split or slit 8 in diametrically opposite sides, and extending into the bottom portion of the T crossing (not shown). The shafting 9 is provided with a slit (not shown) which coincides with the slit 8 of the T. A bolt 7 passing through the T and provided with a locknut 16 serves to clamp the T-connection together. Similar clamping means are provided on standard 12 for retaining the shafting 9 in its extended position or in a position to which it is rotated about its vertical axis. The standard 12 is provided with a longitudinal slit (not shown). Lugs 22 fixed on either side of the slit and interconnected by a bolt 23 provided with a locknut 29 will clamp the standard 12 to the shafting 9 to hold the same in position.

Slidably received within the T-connection 15 are two nested shaftings 17 and 18 of hollow construction. The shafting 17 is of larger diameter, and extends forwardly (Figure 3) while shafting 18 extends rearwardly. Shaft 18 is formed with one or more radial slots 19, while the internal surface of shaft 17 is provided with one or more studs or pins 20 registering in slots 19. The shaft 17 extends through the T 15, the end 21 thereof extending a short distance out of said T.

The shafting 17 is provided at its forward end with a series of through openings 24. Fixed to the top of said T-connection, as by a screw 25, is a leaf spring 26 carrying at its free end an indexing pin 27 which is adapted to be biased by said spring through an opening 28 in said T and to register in one of the openings 24 of shaft 17. The shafting assembly 17, 18 may thus be rotated about a horizontal axis upon removal of the indexing pin 27. The shafting assembly is prevented from rotating by the indexing pin 27 and openings 24, and by reason of the slotted construction of the T and the clamping means operable by the handle 16. The shafting assembly 17, 18 may thus be fixed in any position about a horizontal axis, either positioned by the indexing pin 27 and openings 24 and by the operation of handle 16, or in intermediate positions by the operation of handle 16 alone.

Fixed to the rearwardly extending end of shafting 18 in a suitable manner, is a vertical mounting plate 30. Fastened thereto, as by screws 31 and nuts 32, is an electrical motor 33 provided with a suitable cable connection 34. Integral with the shaft 35 of said motor are a series of pulley sheaves 36 of varying diameters. By its mounting on plate 30, motor 33 will partake of any rotation about a horizontal axis of the shafting assembly 17, 18.

Fixed to the forwardly extending end of shaft 17 is a second T-connection 40 having a horizontally disposed crossing 41. The T 40 serves to prevent longitudinal movement of shafting 17 by virtue of its abutment against a collar 17A and the T-connection 15, for the purposes hereinafter apparent. Rotatably mounted in the T crossing 41 and supported in suitable bearings (not shown) is a horizontal spindle shaft 42. Fastened to the end of said shaft in a suitable manner are a series of pulley sheaves 43 of increasing diameters and in inverse relation with the sheaves 35. A belt 44 transmits rotary motion from sheaves 35 to the sheaves 43 to the shaft 42. As is well known in the art, various speed ratios are possible by changing the pulley connections.

Means is now provided for tightening the belt connection of the pulleys.

To this end there is provided an upstanding ear or lug 45 on the end 21 of shafting 17. Pivoted on said lug, as by pin 46, is a bellcrank 47; one arm 48 being upstanding and longer in length than the other arm 49. Pivoted to arm 49 is a link 50, the other end of which is pivoted to a ring 51 placed about the shafting 18 and whose internal diameter is slightly greater than the external diameter of the shafting.

In loosening the belt 44, the arm 48 is lifted to rotate the bellcrank in a counterclockwise direction (Figure 3). Link 50 will thus move the ring 51 into a vertical position and then into a biased or tilted position (to the left in Figure 3). The ring will thus jam or bite into shafting 18 tending to move the shafting to the left to loosen the belt. In tightening the belt 44, arm 48 is moved clockwise causing the ring 51 to move rearwardly, and jamming against the shafting 18 to move the same to the right. The belt 44 is thus provided with the proper tension. When insufficient tension is obtained, the arm 48 is again moved forward and back to permit the ring to again bite into shafting 18 to move the same outwardly.

The machine thus far described is capable of being positioned so that the spindle shaft 42 may be maintained in a horizontal position as shown in Figure 1, or swung to and fixed in various positions about the horizontal axis of shafting assembly 17, 18 as indicated in Figure 1 by the phantom lines. The spindle shaft may be positioned and fixed in any position including a vertical position. When it is desired to use the machine with the spindle shaft vertical and the pulley sheaves in the lowermost position, the belt 44 is slipped off the sheaves, the spindle shaft rotated to vertical position and fastened, and the belt slipped over the standard 12 onto the pulley sheaves so that the belt then moves on either side of the standard.

The spindle shaft may also be rotated about the vertical axis of the standard 12 as indicated by the phantom lines in Figure 2. Rotation of handle 29 will loosen the clamping means (22, 23) permitting the unit to be swung into any convenient position about the standard 12, and will raise and lower the same as indicated. Tightening of the handle 29 will hold the spindle shaft in its set position. Thus by its universal mounting the machine may be positioned to bring the spindle shaft into any convenient position and with the indexing and locking means provided, fastened in the chosen position.

Means is now provided for attaching various types of tools, such as drills, brushes, files, saws, sanders, milling cutters, etc., to the spindle shaft 42 and to impart rotary motion thereto.

To this end I have provided a novel chuck 60 (Figures 4 and 5) fixed to the shaft 42. The chuck 60 comprises a tapered seat 61 fixed to said spindle shaft in a suitable manner and provided with internal splines 62. The seat 61 is further provided with a series of recessed through openings 63 having seated therein arbor locking pins 64.

The forward external surface of seat 61 is provided with a collar 65. Integral with the rear external surface of said seat is a sleeve or bushing 66. Slidably received over the collar and said bushing is a knurled locking sleeve 67, the forward end of which is of larger diameter forming a surface 68 adapted to slide over the collar 65. A camming surface 77 is also formed on the internal surface of said sleeve adapted to engage the pins 64. The rear internal portion of sleeve 67 is of larger diameter which forms a spring recess 69 with the exterior of seat 61 and houses a coil locking spring 70, the rear end of which abuts the bushing 66. The spring 70 tends to bias sleeve 67 forwardly, or to the right (Figure 4) causing the camming surface 77 to move the pins 64 inwardly to lock the same.

An arbor 71 having a splined portion 72 and a peripheral notched groove 73 is adapted to hold the various types of tools by means of the threaded portion 74 provided therein. In Figure 6 an emery wheel 75 is fixed into the arbor 71 by means of cap screw 76. In Figure 1, I have indicated a wire brush 78 as being mounted in the arbor.

In fitting the arbor into the chuck 60, the sleeve 67 is moved against the bias of spring 70. The tapered end 79 of the arbor will lift the pins 64 permitting the arbor to slide in, the splines 72 and 62 readily meshing. The pins 64 will then drop into the peripheral groove 73 of the arbor to hold the same against movement. Release of the sleeve 67 will permit the spring 70 to move said sleeve outwardly to lock the pins 64.

Means is now provided to insure the forward movement of sleeve 67 to lock the arbor in place and to prevent release of the arbor while the spindle shaft 42 is rotating.

To this end there is provided on bushing 66 a radially extending stud or pin 80 adapted to cooperate with a slot 81 cut on a bias in sleeve 67 and provided with a camming surface 82. The pin 80 is so fixed in bushing 66 that when sleeve 67 is locked in position, the edges of slot 81 registers with the transverse diameter of said pin.

When the locking sleeve 67 is moved backward, pin 80 will lie within the slot 81. The pin 80 will limit the rearward movement of the sleeve so that surface 68 will always remain on collar 65 thus sealing the pins 64 and recessed seats 63 from dirt, oil and the like against fouling. When the spindle starts rotating in a counterclockwise direction (Figure 5) the small inertia of sleeve 67 will provide sufficient lag so that the spindle shaft 42 and bushing 66 will rotate at a higher rate than sleeve 67. The pin 80 will thus abut against the camming surface 82 tending to force the sleeve outwardly into its locking position. The rear edge 83 of the sleeve 67 when in locked position will register with the vertical diameter of the pin 80.

Any attempt by the workman to remove the arbor while the chuck is rotating will fail. Grasping the sleeve 67 and attempting to move the same rearwardly, will slow the speed of the sleeve with respect to that of the spindle 42. The pin 80 will abut the camming surface 82 to maintain the sleeve 67 in its locked position.

It will be apparent that the machine described may readily be equipped with a table upon which the work may be supported. This table could be of the feed type so that when the machine is used for drilling, milling, routing, etc., the table will feed the work past or into the rotating tool.

In Figure 7, I have shown how a standard collet may be used with the chuck 60. A draw bar 85 having a threaded fore part 86 and a hand wheel 87 is longitudinally disposed within the spindle 42. A collet 88 is threaded thereto in the usual manner, a key 89 within the seat 61 turning the collet with the chuck. Tightening of the hand wheel will cause a camming action of the seat 61 and the collet to hold the tool within the collet.

It will thus be evident that there is provided an improved universally mounted machine in which the several objects of this invention are achieved and which is well adapted to meet the conditions of practical use.

As various possible embodiments might be made of the above invention, and as various changes may be made in the embodiments set forth, it is to be understood that all matter herein set forth, or shown in the accompanying drawings, is to be interpreted as illustrative and not in a limiting sense.

Having thus described my invention, I claim as new and desire to secure by Letters Patent:

1. A machine tool comprising a vertical member, a horizontal member comprising two telescoped sections on said vertical member, said horizontal member being rotatable about the vertical axis of said vertical member and locked into position, and rotatable as a unit about its own horizontal axis and locked in position, a motor fixed on one section of said horizontal member, a spindle shaft bearing a chuck on the other section of said member, pulley sheaves for said motor and said spindle shaft, a belt interconnecting said sheaves for transmitting the rotary motion of said motor to said spindle shaft, and jamming means for moving the telescoped section of said horizontal members apart and locking the same for tightening the belt over said pulley sheaves.

2. A machine tool comprising a vertical member, a T-connection for said vertical member, a horizontal member comprising two telescoped sections, the end of one section extending through and beyond said T-connection, a motor fixed to one section, a spindle shaft carrying a chuck rotatably mounted on the other of said sections, pulley sheaves for said motor and said spindle shaft, a belt interconnecting said pulley sheaves, a bell-crank pivoted to said end of the extending section, a link pivoted to said bellcrank, and means pivoted to said link and associated with the other section for moving said section and locking same upon rotation of said bellcrank to tighten said belt.

3. A rotary chuck comprising a seating member adapted to receive an arbor, means in said seating member for retaining said arbor in said member, a movable sleeve for said member for locking said retaining means, and cooperative camming surfaces on said member and on said sleeve for moving to and maintaining in locked position said sleeve upon rotation of said member.

4. A rotary chuck comprising a tapered seat adapted to receive an arbor, a plurality of radially disposed pins in said seat for cooperating with said arbor to retain the same in said seat, a sleeve movable on said seat for locking and unlocking said pins, a biased camming surface on said sleeve and a stud on said seat cooperating with said camming surface to move said sleeve to and maintain the same in pin locking position upon rotation of said seat.

5. A rotary chuck comprising a tapered seat adapted to receive an arbor, a plurality of radially disposed pins in said seat for cooperating with said arbor to retain the same in said seat, a sleeve movable on said seat for locking and unlocking said pins, resilient means cooperating with said sleeve tending to hold the same in locking position, a biased camming surface on said sleeve and a stud on said seat cooperating with said camming surface to move said sleeve to and maintain the same in pin locking position upon rotation of said seat.

6. A rotary chuck comprising a tapered seat adapted to receive an arbor, a plurality of radially disposed pins in said seat for cooperating with said arbor to retain the same in said seat, splines within said seat cooperating with splines on said arbor for holding said arbor against relative rotation, a sleeve movable on said seat for locking and unlocking said pins, resilient means cooperating with said sleeve tending to hold the same in locking position, a biased camming surface on said sleeve and a stud on said seat cooperating with said camming surface to move said sleeve to and maintain the same in pin locking position upon rotation of said seat.

7. A machine tool comprising an upright telescoped supporting member, a T-connection for said upright member, a horizontal supporting member comprising two telescoped sections, the end of one section extending through and beyond said T-connection, clamping means on said T-connection for locking said horizontal member in a preselected position, a second clamping means on said upright member for locking said horizontal member in a preselected position, a spindle shaft rotatably mounted on one of said sections transversely thereto, a motor fixed to the other of said sections, pulley sheaves for said shaft and said motor, a belt interconnecting said sheaves, a bellcrank pivoted to said end of the extending section, a link pivoted to said bellcrank, and means pivoted to said link and associated with the other section for moving said section relative to the other upon movement of said bellcrank to tighten said belt and to lock said sections.

8. In a machine tool, the combination comprising two telescoped sections, rotatable pulley sheaves on each section, a belt interconnecting said sheaves, a bellcrank pivoted to the end of one of said sections, a link pivoted to said bellcrank, and ring means pivoted to said link and encompassing the other section for moving said section relative to the first section upon movement of said bellcrank to tighten said belt and to lock and unlock said sections.

9. A rotary chuck for a detachable and replaceable collet and arbor comprising a tapered seat, means for retaining the arbor and collet against rotation within said seat, a locking sleeve for said seat, abutment means within said seat for holding the arbor within said seat when the sleeve is in its locking position, and a hollow driving spindle for said seat through which a draw bar may be passed to hold the collet within said seat.

ANTON J. SCHICK.

REFERENCES CITED

The following references are of record in the file of this patent:

UNITED STATES PATENTS

| Number | Name | Date |
| --- | --- | --- |
| 262,074 | Maltby | Aug. 1, 1882 |
| 520,665 | Benham et al. | May 29, 1894 |
| 1,350,403 | Chase | Aug. 24, 1920 |
| 1,477,426 | Carlson | Dec. 11, 1923 |
| 1,784,972 | Newbrough | Dec. 16, 1930 |
| 1,839,835 | Cook | Jan. 5, 1932 |
| 1,958,734 | Woodsmall | May 15, 1934 |
| 2,076,918 | Robison | Apr. 13, 1937 |
| 2,273,696 | Ducker | Feb. 17, 1942 |
| 2,324,416 | Murray | July 13, 1943 |
| 2,395,534 | Cook | Feb. 26, 1946 |

FOREIGN PATENTS

| Number | Country | Date |
| --- | --- | --- |
| 650,470 | Germany | Sept. 23, 1937 |